Dec. 28, 1954 L. SCHWEIZER 2,698,048
PORTABLE AUXILIARY BUMPER SUPPORTED SEAT
Filed Dec. 24, 1953
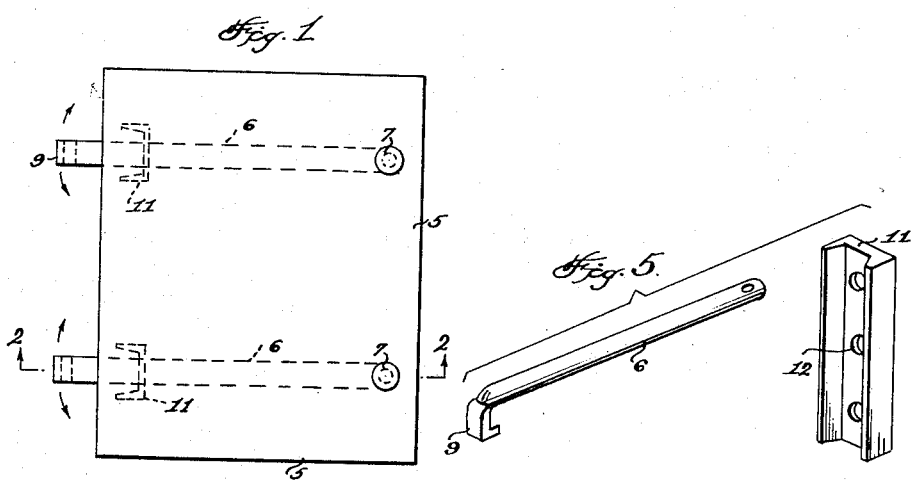
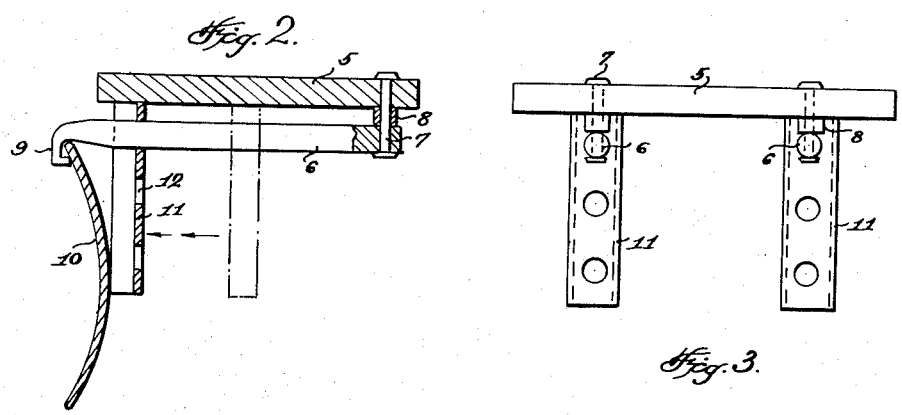
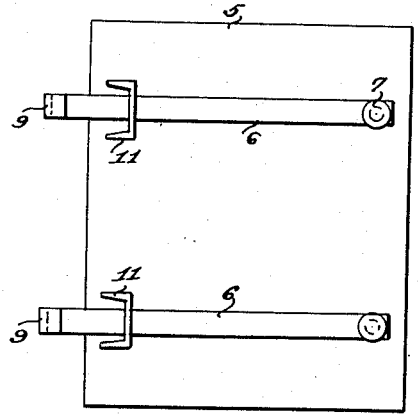
LOUIS SCHWEIZER INVENTOR
BY *CA Snow &Co.*
ATTORNEYS.

United States Patent Office 2,698,048
Patented Dec. 28, 1954

2,698,048

PORTABLE AUXILIARY BUMPER SUPPORTED SEAT

Louis Schweizer, Hattiesburg, Miss.

Application December 24, 1953, Serial No. 400,194

3 Claims. (Cl. 155—78)

This invention relates to a portable seat construction designed primarily for attachment to a support, preferably a motor vehicle bumper.

An important object of the invention is to provide a portable seat of this character which may be folded into a small and compact article to facilitate storing of the seat wherein only small spaces are available, such as the conventional trunk of a motor vehicle.

Another object of the invention is to provide a seat of this character embodying arms having hooks at their inner ends which are extended beyond the seat section to which the arms are connected, for hooking over a vehicle bumper, there being provided adjustable clamping members movable along said arms, which clamping members cooperate with such hooks for securely clamping the bumper, to hold the seat in place.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing:

Figure 1 is a plan view of a portable seat constructed in accordance with the invention.

Fig. 2 is a sectional view taken on line 2—2 of Fig. 1.

Fig. 3 is a rear elevational view thereof.

Fig. 4 is a bottom plan view thereof.

Fig. 5 is an exploded view illustrating one of the seat rods and clamping members in perspective.

Referring to the drawing in detail, the seat embodies a seat section indicated generally by the reference character 5, to which the forward ends of the clamping arms 6 are pivotally connected, as by means of the bolts 7. These bolts 7 extend vertically through openings in the seat section 5 and pass through openings in one of the respective ends of the clamping arms 6.

Spacers 8 are disposed between the arms 6 and the seat sections 5, holding the clamping arms in spaced relation with respect to the seat section, for purposes to be hereinafter more fully described.

This construction permits of free swinging movement of the clamping arms 6 so that they may be adjusted to fit over the support or bumper of a particular shape.

Hooks 9 are formed at the other ends of said clamping arms 6 and are so constructed that they will fit over the upper edge of a front or rear bumper of a motor vehicle, a bumper in the present showing being indicated by the reference character 10.

Mounted for movement longitudinally of each clamping arm 6, is a clamping bar 11, the bars 11 being of channel shape with their open sides disposed towards the rear end of the seat to contact with the bumper, in a manner as shown by Fig. 2 of the drawing. These clamping bars are provided with lines of spaced openings 12, designed to receive the clamping arms 6, the clamping bars 11 being adjustable longitudinally of the clamping arms 6. The openings 12 are of a diameter slightly larger than the diameters of the clamping arms 6 so that when the clamping bars are moved to engage the outer surface of the bumper over which the hooks 9 are positioned, a binding action will be set up between the clamping bars 11 and clamping arms 6 under the weight of the person seated on the seat section 5, holding the seat section in its proper position.

By constructing the clamping arms and clamping bars in the manner as described, it will be obvious that the seat may be used in connection with bumpers of various curvatures and thicknesses.

From the foregoing it will be seen that due to the construction shown and described, I have provided an auxiliary seat which may be readily and easily positioned over a bumper of a motor vehicle, providing a seat particularly adapted for viewing baseball games, picnicing, or as a matter of fact for use in places where the seat may be supported by a bar, for temporary use.

Having thus described the invention, what is claimed is:

1. A portable seat embodying a seat section, parallel horizontal clamping arms secured to the lower side of said seat section adjacent to the side edges thereof, spacers disposed between said clamping arms and seat section holding said arms spaced from the seat, a hook formed on one of the respective ends of each arm, said hooks adapted to hook over the upper edge of a supporting bar, and vertical clamping bars slidably mounted on said clamping arms adapted to engage the forward surface of such supporting bar, adapted to cooperate with said hooks in clamping the seat in a horizontal position on said supporting bar.

2. A portable seat embodying a seat section, parallel horizontal clamping arms having one of their respective ends pivotally connected to the lower surface of said seat section, hooks formed on the other ends of said clamping arms adapted to hook over a motor vehicle bumper, vertical clamping bars having openings through which said clamping arms extend, and said clamping bars adapted to cooperate with said hooks in clamping a bumper on which the portable seat is to be supported.

3. A portable seat embodying a seat section, parallel horizontal clamping arms having one of their respective ends secured to the lower surface of said seat section, adjacent to the forward edge thereof, hooks formed on the other ends of said clamping arms adapted to hook over a motor vehicle bumper, vertical clamping bars having openings through which said clamping arms extend slidably securing the clamping bars on said clamping arms, the upper ends of said clamping bars resting squarely against the bottom of said seat section, and said clamping bars adapted to cooperate with said hooks in clamping the bumper on which the portable seat is to be positioned.

References Cited in the file of this patent

UNITED STATES PATENTS

| Number | Name | Date |
|--------|------|------|
| 501,442 | Rodgers | July 11, 1893 |
| 2,612,207 | Branson | Sept. 30, 1952 |

FOREIGN PATENTS

| Number | Country | Date |
|--------|---------|------|
| 365,734 | Great Britain | Jan. 28, 1932 |